US006772240B1

(12) United States Patent
Chung

(10) Patent No.: US 6,772,240 B1
(45) Date of Patent: Aug. 3, 2004

(54) METHOD FOR SAVING REGISTER SPACE IN A CONVENTIONAL HIGH-LEVEL FUNCTION CALL PROCESS

(75) Inventor: Yu-Chi Chung, Jubei (TW)

(73) Assignee: Faraday Technology Corp., Hsinchu (TW)

( * ) Notice: Subject to any disclaimer, the term of this patent is extended or adjusted under 35 U.S.C. 154(b) by 0 days.

(21) Appl. No.: 10/377,870

(22) Filed: Mar. 4, 2003

(51) Int. Cl.[7] .................................................. G06F 13/00

(52) U.S. Cl. ......................... 710/33; 709/310; 709/311; 709/312; 709/319; 709/320; 709/321

(58) Field of Search .................... 710/33; 709/310–312, 709/319–321; 719/328–332; 717/130–136, 151–155; 712/220–234

(56) References Cited

U.S. PATENT DOCUMENTS 4,351,024 A * 9/1982 Bradley et al. ............. 719/310
4,819,155 A * 4/1989 Wulf et al. ................. 712/207
5,220,669 A * 6/1993 Baum et al. ................ 718/108
5,487,158 A * 1/1996 Amelina et al. ............ 717/136
5,659,751 A * 8/1997 Heninger ..................... 719/332
5,701,489 A * 12/1997 Bates et al. ................. 717/157
6,029,207 A * 2/2000 Heninger ..................... 719/331
6,070,010 A * 5/2000 Keenleyside et al. ....... 717/154

* cited by examiner

*Primary Examiner*—Christopher B. Shin
(74) *Attorney, Agent, or Firm*—Rabin & Berdo, P.C.

(57) ABSTRACT

A method for saving register space in a conventional high-level function call process. The method essentially places parameters starting from either of two ends of a sequence of registers for parameter pass, based on data length, thereby reducing register waste and increasing the utility of registers when a function call is coded by a high-level compiler. Thus, the compiler for a high-level program can effectively perform the function call pass.

6 Claims, 2 Drawing Sheets

METHOD FOR SAVING REGISTER SPACE IN A CONVENTIONAL HIGH-LEVEL FUNCTION CALL PROCESS

BACKGROUND OF THE INVENTION

1. Field of the Invention

The invention relates to a method for saving register space, particularly to a method for saving register space in a conventional high-level function call process, which increases the utility of registers when a function call is coded by a high-level compiler, thus increasing the function call efficiency of a software program.

2. Description of Related Art

In a conventional high-level function call, parameters are methodically stored in specific registers in order to pass them to a callee, or methodically stored in a memory stack in order to pass them to the callee. To increase the cited performance, a high-level compiler commonly stores all or partial parameters in registers for passing to the callee, thus speeding call process.

Existing processors generally have multiple 32-bit registers. However, data types for operations are different in high-level languages. For example, data types exist comprising 8, 16 and 32 bits. One manner for increasing utility is to split a single register to several parts like an upper and lower word in some registers. For example, registers R0–R7 in a Register File respectively have 32 bits, in which R0L representing lower 16 bits and R0H representing upper 16 bits can be operated separately. Thus, a high-level compiler generally selects R0 for 32-bit data and R0L or R0H for 16-bit data. However, if the 32-bit data is stored in two registers such as R0H and R1L, the compiler cannot access both at a time and proceeds further in operation.

FIG. 1 is a schematic diagram of a conventional parameter placement for pass. As shown in FIG. 1, a conventional high-level compiler methodically places parameters Arg1, Arg2, and Arg3 in registers when compiling program codes for a function call so that a waste of register space occurs. For example, data types for parameters Arg1, Arg2 and Arg3 respectively are 16, 32 and 16 bits. The 16-, 32- and 16-bit data are methodically stored in first, second and third 32-bit registers R0, R1 and R2. As such, a total of 32 bits (R0H and R2H) are wasted. However, this problem will continue because the high-level compiler has to obey the predetermined rules to compile function calls to ensure exact coding between a callee and callee program.

SUMMARY OF THE INVENTION

Accordingly, an object of the invention is to provide a method for saving register space in a conventional high-level function call process, which increases the utility of registers when a function call is coded by a high-level compiler, thus increasing the function call efficiency of a software program.

The invention provides a method for saving register space in a conventional high-level function call process, which can place parameters from either of two ends of a sequence of registers for parameter pass, based on data length, thereby reducing register waste. The method includes methodically arranging a sequence of registers for parameter pass, sequentially naming every k bits in the sequence from left to right as a first group, sequentially naming every k/2 bits in the sequence from right to left as a second group, and sequentially placing input parameters with a width exceeding k/2 in the first group from left to right or conversely with a width less than or equal to k/2 in the second group from right to left.

DETAILED DESCRIPTION OF THE INVENTION

The following numbers denote the same elements throughout the description and drawings.

Figure 1:
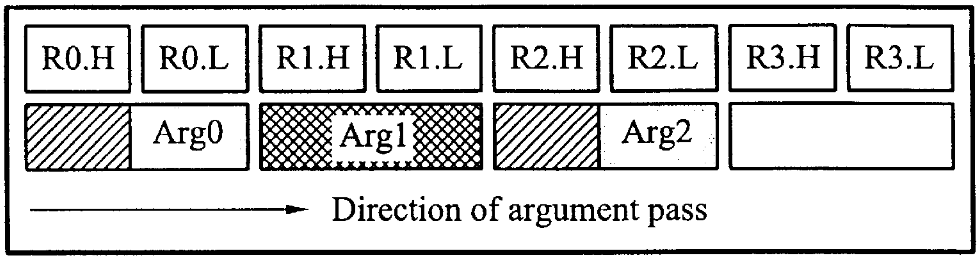
FIG. 1 is a schematic diagram of a conventional parameter placement for pass.
Figure 2:
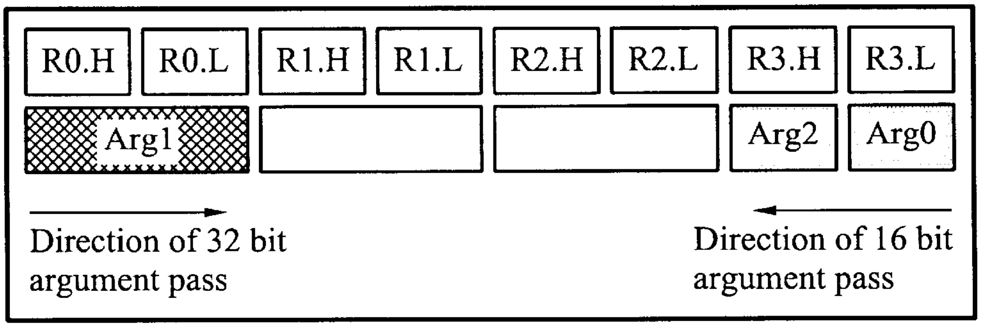
FIG. 2 is a schematic diagram of a parameter placement for pass according to the invention.

FIG. 2 is a schematic diagram of a parameter placement for pass according to the invention. By comparison of FIGS. 1 and 2, the most significant difference between convention and the invention is conventional arrangement with a single entry while the invention is arranged with bi-directional entries. As shown in FIG. 2, the cited parameters Arg0, Arg1 and Arg2 are placed bi-directionally. The parameter Arg1, a 32-bit argument pass, is placed from left, i.e., on R0H and R0L positions, and the parameters Arg0 and Arg2, respectively 16-bit argument passes, are methodically placed from the right, i.e., on R3L and R3H positions. Thus, the invention saves approximately ⅓ register space compared to the conventional method. As well, if parameters have other widths such as 8 or 4 bits, the registers can be divided into several smaller parts as needed.

If register number is n for each k bits and each register with k bits can be divided into H and L parts, the algorithm for the above-mentioned is as described below.

Firstly, all registers for parameter pass are methodically arranged as a sequence and named as a register name for every k bits from left to right in the sequence. For example, each register with k bits is assigned a name sequentially from R0~Rn−1 (R group). As well, register names P0~P2n−1 (P group) are assigned by every k/2 bits from right to left in the sequence. As cited, two pointers t and u are respectively indicated to R and P groups for parameter pass placement. At initialization, both t and u are zero.

Sequentially, a width of an input parameter to be passed is determined when the input parameter is entered. The input parameter is placed into the R group when the width of the input parameter is exceeding k/2 and the pointer t is increased by 1. Conversely, the input parameter is placed into the P group when the width of the input parameter is less than or equal to k/2 and the pointer u is increased by 1.

Finally, all parameters to be passed are placed into the R group or the P group based on their corresponding widths, until no more parameter or register space exists.

Figure 3:
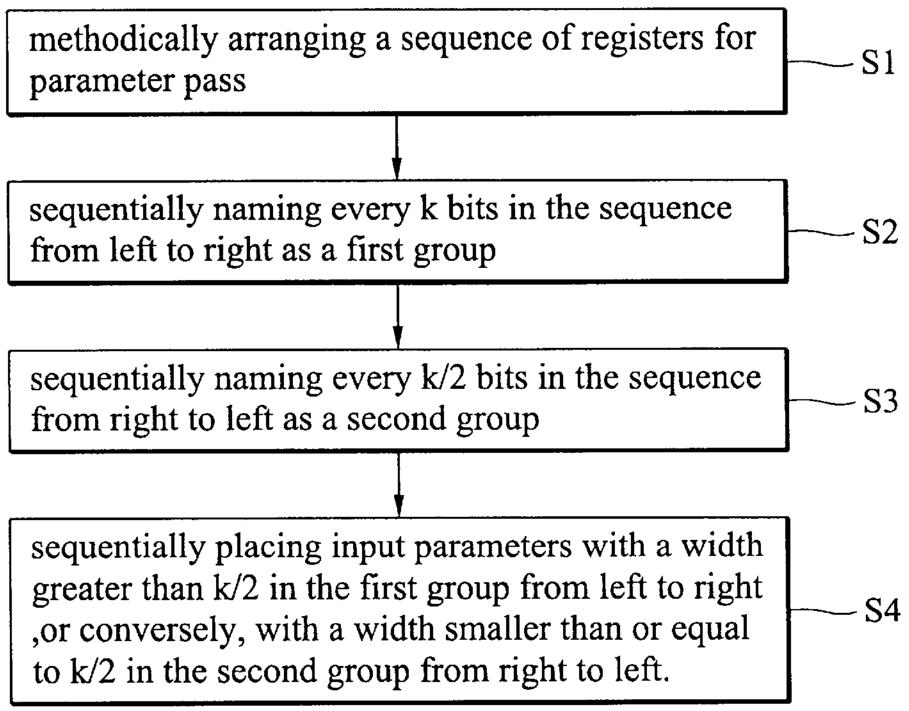
FIG. 3 is a flowchart of FIG. 2 according to the invention.

In summary, as shown in FIG. 3, the inventive method includes methodically arranging a sequence of registers for parameter pass (S1), sequentially naming every k bits in the sequence from left to right as a first group (S2), sequentially naming every k/2 bits in the sequence from right to left as a second group (S3), and sequentially placing input parameters with a width exceeding k/2 in the first group from left to right or, conversely, with a width less than or equal to k/2 in the second group, from right to left (S4).

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method for saving register space in a conventional high-level function call process, comprising the steps:

methodically arranging a sequence of registers for parameter pass;

sequentially naming every first width in the sequence from left to right as a first group;

sequentially naming every second width in the sequence from right to left as a second group; and sequentially placing input parameters with a width exceeding the second width in the first group from left to right or, conversely, with a width less than or equal to the second width in the second group, from right to left.

2. The method of claim 1, wherein the second width is ½ of the first width.

3. The method of claim 1, wherein the first group and the second group have machine-dependent width in total.

4. The method of claim 1, further comprising using two pointers to respectively indicate the first group and the second group when sequentially placing the input parameters in naming order.

5. The method of claim 4, wherein the two pointers are zero at initialization and increased by one after placement of one input parameter.

6. The method of claim 5, wherein the one increase by the first group's pointer indicates to advance the first width and the one increase by the second group's pointer indicates to advance the second width.

* * * * *